United States Patent [19]
Rodgers

[11] B 3,925,167
[45] Dec. 9, 1975

[54] MULTI-STAGE DISPOSABLE STILL

[75] Inventor: Franklin A. Rodgers, Brookline, Mass.

[73] Assignee: Pactide Corporation, Cambridge, Mass.

[22] Filed: Dec. 22, 1972

[21] Appl. No.: 317,624

[44] Published under the Trial Voluntary Protest Program on January 28, 1975 as document no. B 317,624.

[52] U.S. Cl. ............... 202/174; 202/236; 202/266; 203/10; 159/DIG. 27; 165/166; 165/167
[51] Int. Cl.² .................... B01D 1/26; B01D 3/00
[58] Field of Search ........ 203/10, 11; 202/236, 266, 202/174, 173; 159/DIG. 27; 165/166, 167, 1

[56] References Cited
UNITED STATES PATENTS

| | | | |
|---|---|---|---|
| 2,288,061 | 6/1942 | Arnold | 165/166 |
| 3,111,982 | 11/1963 | Ulbricht | 165/166 |
| 3,129,145 | 4/1964 | Hassler | 159/DIG. 27 |
| 3,129,146 | 4/1964 | Hassler | 159/DIG. 27 |
| 3,183,963 | 5/1965 | Mondt | 165/166 |
| 3,244,224 | 4/1966 | Hnilicka, Jr. | 165/136 |
| 3,340,186 | 9/1967 | Weyl | 203/10 |
| 3,477,917 | 11/1969 | Rodgers | 203/10 |
| 3,497,423 | 2/1970 | Rodgers | 203/10 |
| 3,650,905 | 3/1972 | Rodgers | 203/10 |
| 3,661,721 | 5/1972 | Rodgers | 203/10 |

*Primary Examiner*—Wilbur L. Bascomb, Jr.
*Attorney, Agent, or Firm*—Michael Bard; John W. Ericson

[57] ABSTRACT

A multi-stage still is disclosed having particular utility in the desalination of water. The still comprises an array of alternating vapor impermeable and vapor permeable stacked membranes in laminar relation. Thus, each permeable membrane is sandwiched between a pair of impermeable membranes which form discrete channels on opposite sides of the permeable membrane for conducting distilland and distillate flow.

The impermeable membranes are corrugated with their respective corrugations alternately canted in opposite directions with respect to the direction of fluid flow to prevent nesting of the impermeable membranes. Such opposite canting of the corrugations of alternate impermeable membranes functions to preserve the general direction of fluid flow.

27 Claims, 6 Drawing Figures

MULTI-STAGE DISPOSABLE STILL

BACKGROUND OF THE INVENTION

This application relates generally to a novel distillation apparatus for recovering a purified solvent from a mixture of such solvent with one or more solutes and, more particularly, to an improved still for recovering potable water from saline or brackish water.

A number of U.S. patents and copending applications disclose distillation systems and processes particularly adapted to the demineralization, e.g., desalination, of water in which a feed or distilland liquid such as brackish or salt water is circulated in contact with one side of a microporous membrane permeable to the vapor of the liquid and impermeable to the liquid itself under the operating conditions. A distillate liquid, e.g., distilled water, is maintained in contact with the opposite side of the membrane. Heat is transferred to the distilland liquid to vaporize it while heat is transferred from the distillate liquid to cause the vapor of the liquid to pass through the membrane and be condensed as distillate.

Multiple-stage distillation systems are described in which the heat from the distillate of each stage is transferred from the distilland of a succeeding stage and so forth. In systems of this type, several membranes or sections thereof are arranged in stacked relation with alternating barriers which cooperate to form channels on opposite sides of each membrane for distilland and distillate liquids. Distillation methods and apparatus of this type are described in U.S. Pat. Nos. 3,406,096, 3,477,917, 3,497,423, 3,340,186, 3,650,905, 3,661,721, and in copending application Ser. No. 80,570, filed Oct. 14, 1970 by Franklin A. Rodgers and now abandoned.

A preferred embodiment of the distillation apparatus disclosed in the aforementioned patents and application includes a multiple-stage distillation unit in which both the microporous membranes and the spacers are formed of polymeric materials, the spacers being in the form of thin films.

It has been found that suitable materials for such membranes are those which lend themselves to the formation of microporous membranes having a high proportion of voids, e.g., 70 to 80 percent, and have uniform pore distribution and which are inherently poorly wettable or non-wettable, e.g., hydrophobic, by the distillate liquid or can be treated to render them poorly wettable or non-wettable by the liquid. Examples of polymers particularly adapted to the formation of membranes useful in water desalination are disclosed in the aforementioned patents and application and include the fluorocarbons such as polytetrafluoroethylene and polyvinylidene fluoride are preferred because they are inherently poorly wettable by water. Methods of manufacturing microporous membranes of this type are known in the art and include solvent-non-solvent systems such as disclosed, for example, in U.S. Pat. No. 3,642,668, issued to Bailey, et al., on Feb. 15, 1972.

Polymeric materials useful as the barrier films are selected according to criteria including: compatibility with the liquids involved; costs, ease of fabrication and assembly; useful operating temperatures; and thermal conductivity. Polymers particularly suitable for water desalination include polycarbonates, polyesters, polyethylene, polypropylene, and halogenated polyethylenes, particularly the fluorocarbons.

In a distillation unit of this type, the barrier films are corrugated to provide channels for the flow of distillate and distilland liquids in contact with opposite sides of porous membranes which are secured to adjacent barrier films in selected regions, particularly at the edges of the membranes and/or barrier films, to control the circulation of the liquids and confine the liquids to their proper channels.

In a typical distillation system such as disclosed in the aforementioned patents and application, the membrane and barrier films are rectangular and stacked with their edges in alignment, secured to one another adjacent their edges to form a parallelepiped-shape unit. This unit comprising the membranes and films is coupled with: an external means for introducing liquids into and withdrawing liquids from the unit; means for transferring heat to the unit; and means for transferring heat from the unit.

To conduct particular liquids to selected channels within the unit, aligned holes are provided through the stacked membranes and films and a selected channel is blocked in regions surrounding the aligned holes in the membrane and film defining the channel in order to prevent the flow of liquid into or from the selected channel through the holes in the membrane and film.

The external means for introducing into and withdrawing liquids from the unit, as well as transferring heat to and from the unit, generally comprise a pair of plates or headers between which the stack of membranes and films comprising the unit are engaged, together with liquid conduit means (such as manifolds) coupled with the holes in the outer films of the unit for introducing and withdrawing liquid means for heating one of the headers and liquid means for cooling the other header. Thus, a still of this type constructed according to the prior art comprises a unit formed of stacked membranes and films enclosed at least on two sides by heating and cooling elements as well as liquid conducting means for coupling holes in the unit with external accessories such as circulating pumps, etc.

SUMMARY OF THE INVENTION

The present invention provides a still and may, by way of example, find particular utility in the recovery of potable water from brackish water. The still is particularly compact and is suitable for use in a distillation system mounted on or under a counter adjacent to a water supply and drain such as is found in a normal sink.

In prior art stills such as described hereinabove, it has been found, upon assembly, that the corrugated impermeable barriers tend to nest together. Such nesting tends to force the porous membranes to follow and fill the convolutions of the corrugations, thereby restricting flow in the channels. In order to prevent such nesting and consequent flow restriction, the present invention comprises a compact still incorporating stacked, alternating microporous membranes and corrugated barrier films to form a generally rectangular parallelepiped-shape unit. The corrugated barrier films are aligned at a slight angle to the direction of liquid flow with alternate corrugated barrier membranes having the angularity of their respective corrugations reversed with respect to the direction of liquid flow. Thus, where the aligned corrugations of the barrier film between a first pair of stages are at an angle of, e.g., ($\theta$) degrees with respect to the direction of liquid flow than the angle of the aligned corrugations of the barrier membrane between an adjacent stage of the multi-stage still will be oriented at an angle of (360-θ) degrees with respect to the direction of fluid flow. It has been found that such a construction will prevent nesting and permit the channels to remain unrestricted while at the same time preserving the general directionality of liquid flow.

In consequence of the foregoing, it is an object of this invention to provide a relatively simple and inexpensive multi-stage still of improved construction.

Another object of the present invention is to provide an improved multi-stage still structure having alternating stacked microporous and impermeable barrier membranes and incorporating means for preserving the directionality of fluid flow while preventing the restriction of flow channels formed between adjacent microporous and impermeable barrier membranes.

It is a further object of this invention to provide an improved multi-stage still for the distillation of water, of the type including stacked alternating microporous and corrugated impermeable barrier membranes with the corrugations of any particular barrier membrane being aligned at an angle with respect to the direction of fluid flow and with the corrugations of the next impermeable barrier membrane in the stacked array being aligned with respect to the general direction of fluid flow at the same angle but in the opposite direction to the corrugations of the first-mentioned barrier membrane.

DESCRIPTION OF THE DRAWINGS

Other objects and many of the attendant advantages of the instant invention will be better appreciated and said invention will become clearly understood by reference to the following detailed description when considered in conjunction with the accompanying drawings illustrating one embodiment of the subject invention, wherein:

FIG. 2a provides a diagrammatic side plan of a portion of the system of FIG. 2;

Figure 1:
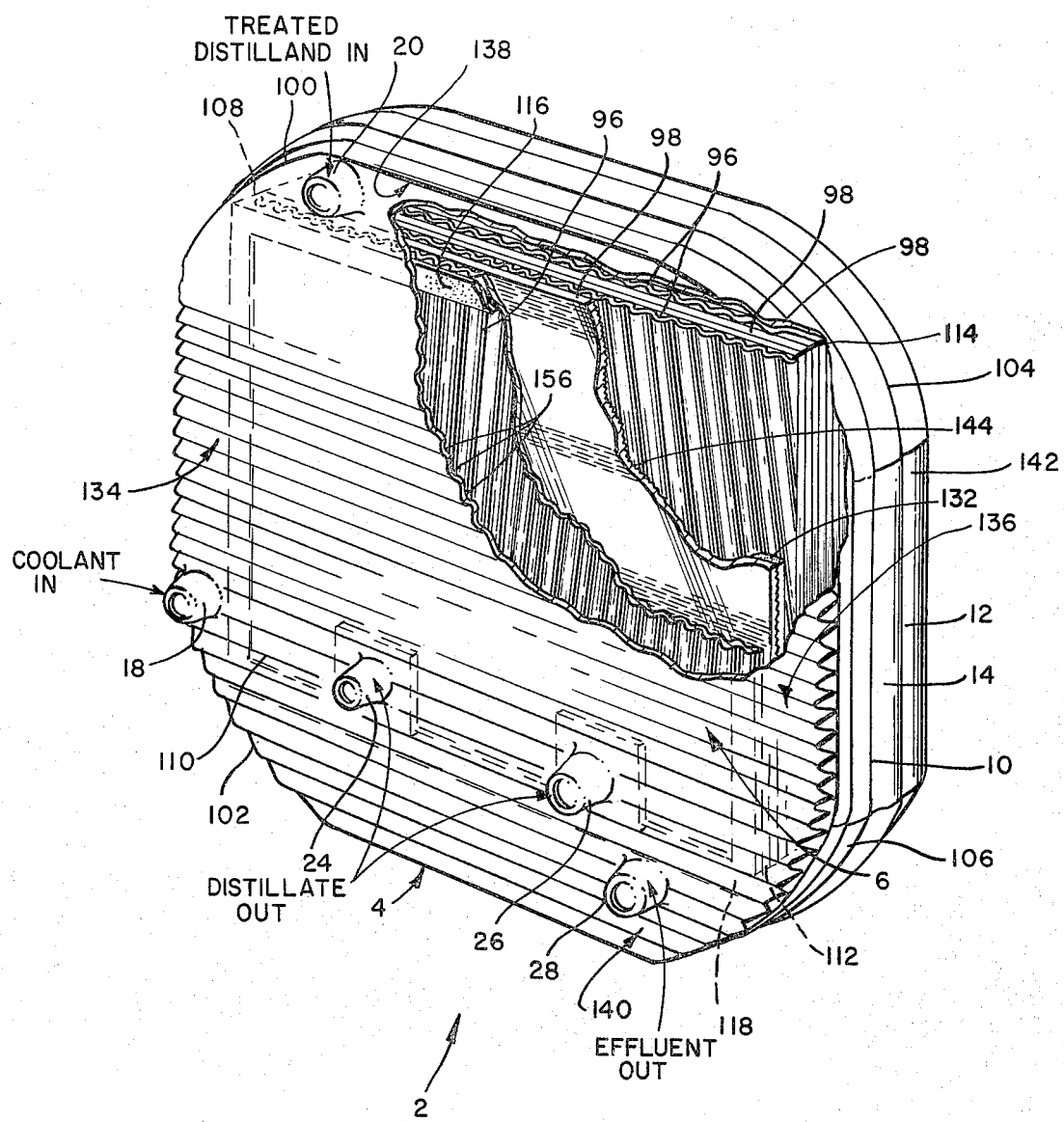
FIG. 1 provides a perspective of the subject invention partly broken away to reveal a portion of the inner structure thereof.
Figure 4:
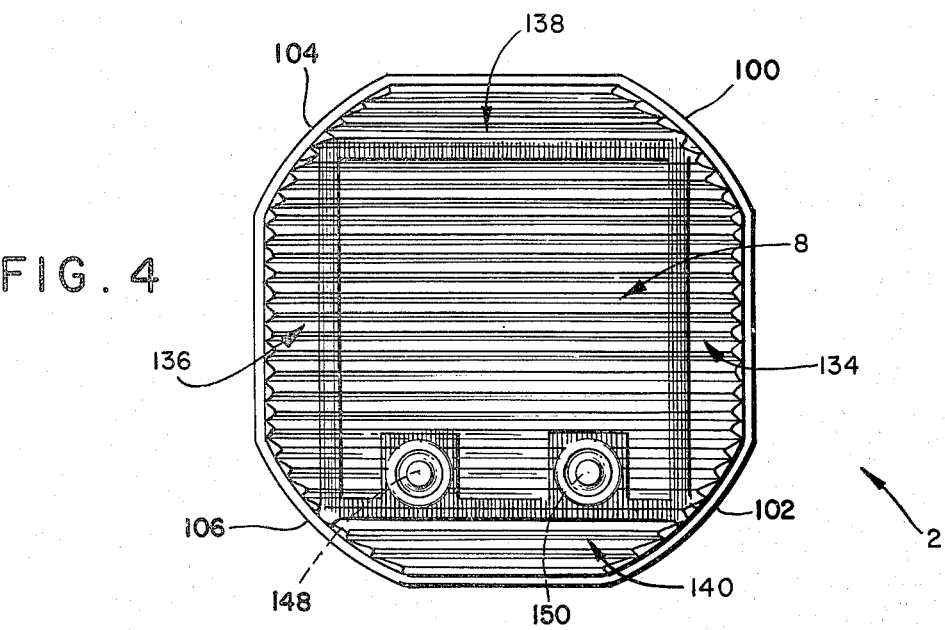
FIG. 4 provides a rear elevation of the subject invention.
Figure 5:
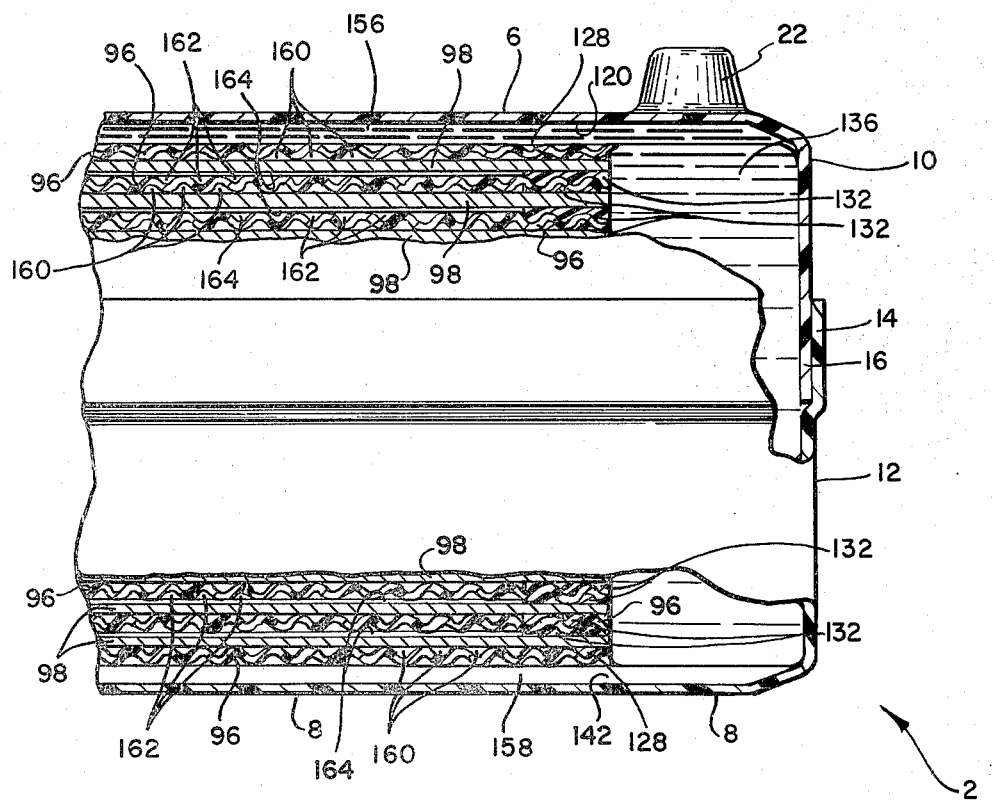
FIG. 5 provides a broken-away bottom elevation of the subject invention partly in section.

Referring to the drawings in more detail, and more particularly to FIGS. 1, 4, and 5, the disposable still of the subject invention is illustrated generally at 2 and is seen to include a generally rectangular housing 4 which is typically transparent and may comprise polysulfone or other suitable plastic material. The housing 4 is seen to include a front cover portion 6 and a rear cover portion 8 which extend to peripheral skirt portion 10 and 12, respectively. The peripheral skirt portion 12 of the rear cover portion 8 extends to a slightly flared edge 14 which, as best seen in FIG. 5, is adapted to fit over the edge portion 16 of the front cover 10, and the cover portions 10 and 12 are joined together at their overlapping edge portions 14 and 16 to form a water-tight seal, as by means of a suitable adhesive such as nitril rubber manufactured and sold by B. F. Goodrich under the designation A1060B.

Figure 2:
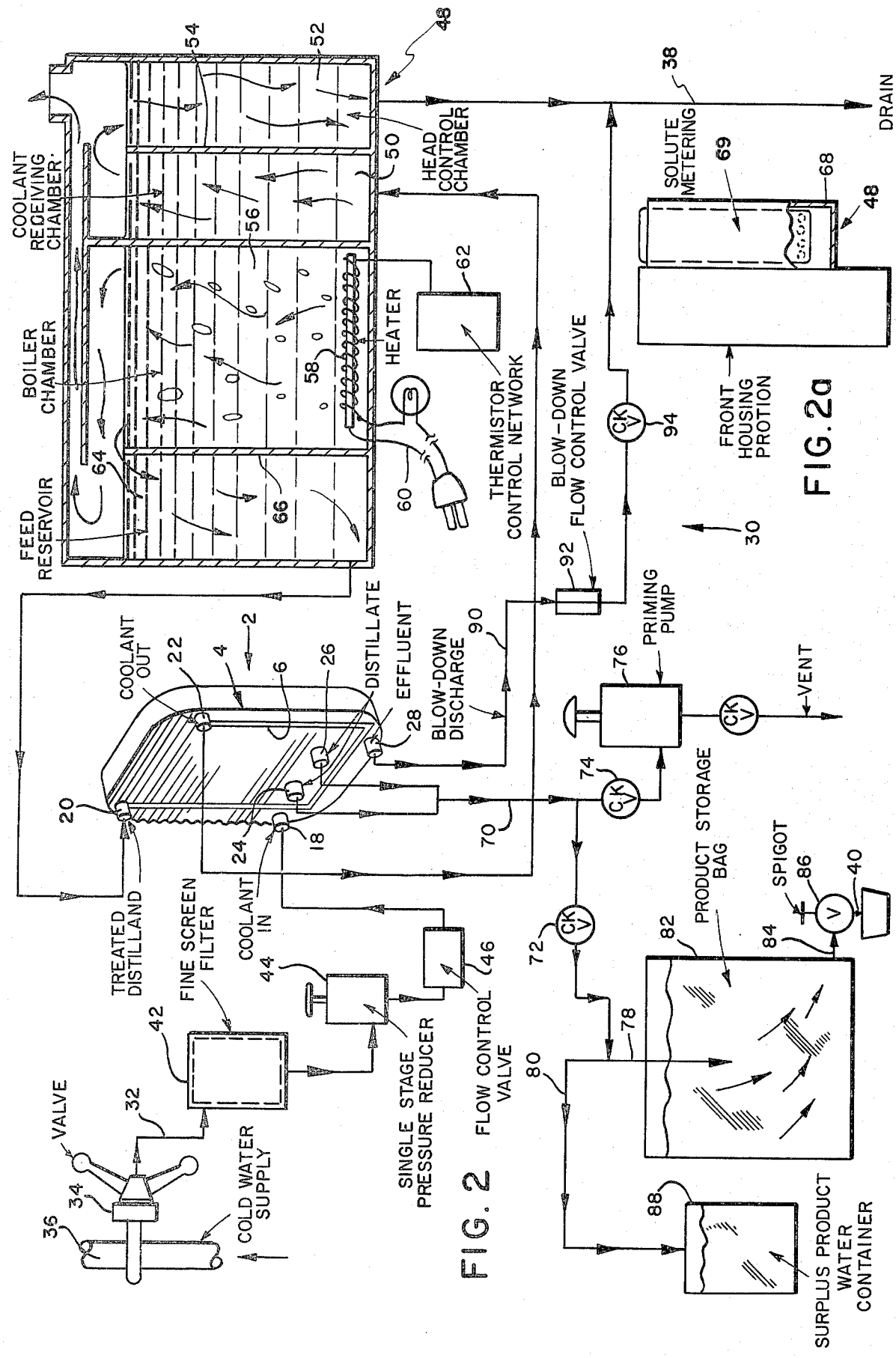
FIG. 2 provides a simplified functional schematic illustrating the invention in conjunction with a distillation system for home use.

As best seen in FIGS. 1 and 2, the front cover portion 6 is provided with a plurality of nipples 18, 20, 22, 24, 26, and 28 which function to conduct fluid to and from the interior of the housing 4, as will be described in more detail hereinafter.

As best illustrated in FIG. 2, the disposable still 2 is adapted for use in a distillation system 30 which is designed for mounting on a kitchen counter top adjacent the cold water and drain lines of the kitchen sink (not shown) or, alternately, the system 30 may be mounted underneath the kitchen counter.

The distillation system 30 is provided with a water supply line 32 one end of which is connected to a line piercing valve 34 of a well-known type which is adapted to connect to a cold water supply line 36 of the kitchen sink. The distillation system 30 is further provided with a drain line 38 which is adapted to connect to the kitchen sink drain (not shown). Additionally, the distillation system 30 is provided with a product output line 40 through which potable water may be extracted from the system 30.

The distillation system 30 includes a fine screen filter 42 which is connected to the water supply line 32 and functions to screen out all undesired particles in the cold water supply which are larger than, e.g., 70 microns. The fine screen filter 42 is of a variety well known in the art and typically includes a replaceable screen element (not shown).

Inasmuch as the common cold water supply from a kitchen sink is under a pressure on the order of 80 psig., and because such line pressure fluctuates considerably, a well-known type of single-stage pressure reducer 44 is connected to the output of the fine screen filter 42 and provides a regulated output pressure of approximately 5 psig. A flow control valve 46, which may typically comprise a relatively long small diameter pipe, is connected at one end to the output of the single-stage pressure reducer 44 and at its other end to the cold water input of the still 2 via the nipple 18.

The disposable still 2 is connected to and receives treated feed water from a novel boiler-deaerator and distilland conditioning apparatus illustrated generally at 48, more fully described in copending applications Ser. Nos. 317,622 and 317,653, both filed Dec. 22, 1972 and commonly assigned herewith. The combination water treatment device 48 is seen to include a first chamber 50 which receives cold water from the still 2. The first chamber 50 is separated from a second chamber 52 by a partition 54 of a predetermined height so that water from the first chamber 50 will overflow the partition 54 into the second chamber 52, thereby maintaining the liquid level or pressure head in the combination water treatment device 48 at the height of the partition 54. The second chamber 52 is connected through the drain line 38 (which functions as a common drain for the distillation system 30) to the sink drain (not shown) thereby preventing the second chamber 52 from filling above the height of the partition 54.

The combination water treatment device 48 is provided with a third or boiler chamber 56 the lower portion of which communicates with the first chamber 50 (through a channel therebetween, not shown) to receive cold feed water from said chamber 50. An electric heating element 58 is disposed within the bottom portion of the boiler chamber 56 in a well-known manner and is provided with a cord and plug assembly 60 for connection to a common 110 volt power supply (not shown).

The heating element 58 is controlled by a common thermistor control network 62 for safety and extended still life. Should the water supply fail and the water chamber 56 run dry, the control network 62 will sense an overheating condition and turn the heating element 58 off. Similarly, a power failure of a duration that would allow water in the boiler chamber 56 to cool below, e.g., 140°F, would be sensed and the heating element 58 would be shut down until normal start-up procedures were followed again, as detailed hereinafter.

The combination water treatment device 48 is provided with a fourth chamber 64 which is separated from the boiler chamber 56 by a partition 66 of the same height as the partition 54 and over which heated and deaerated water from the boiler chamber 56 flows into the fourth chamber 64 which functions as a feed water reservoir. The feed water reservoir or fourth chamber 64 is provided with an opening (not shown) which communicates with a fifth chamber 68 (FIG. 2a) which incorporates a solute metering mechanism 69 and controls the pH of the heated feed water in the reservoir 64, via the opening therebetween, as more fully described in copending application Ser. No. 317,653, filed Dec. 22, 1972, and commonly assigned herewith. The fourth chamber or reservoir 64 communicates with the still 2 in a manner more fully described in copending application Ser. No. 317,623, filed Dec. 22, 1972, and commonly assigned herewith to provide heated, deaerated, and treated feed water thereto via the nipple 20. The vapor of the heated and treated feed water is permitted to pass through the pores of the microporous membranes within the still 2 (which will be described in more detail infra) where it is cooled and condensed by cold water circulating through the still 2 from the flow control valve 46 and fed from the still 2 via the nipple 22 to the first chamber 50.

The vapor of the treated and heated feed water which passes through the microporous membranes, and is cooled as aforesaid, condenses to form the potable product water and flows through product water channels in the still 2 and out through the nipples 24 and 26 to a connecting line 70 and thence to a pair of check valves 72 and 74 which are connected in parallel to the connecting line 70. The check valves 72 and 74 permit water to flow through them in one direction only with the check valve 74 being connected between the product water connecting line 70 and a priming pump 76, and the check valve 72 being connected between the connecting line 70 and the junction of a pair of parallel product water lines 78 and 80.

The product water line 78 provides the input to a product storage bag 82 which is provided with an output line 84 that connects to a flow control valve or spigot 86 which, in turn, is connected to the product output line 40 from which the potable water is extracted. The product water line 80 functions as an overflow line and conducts surplus product water to a surplus product water container 88 in the event that the product water is permitted to build up at a faster rate than it is withdrawn from the product storage bag 82.

As the heated and treated feed water or distilland is circulated through the still 2 and the solvent or distillate is drawn off as potable product water, the solute concentration of the distilland is increased. The distilland with the increased solute concentration comprises the effluent in the distillation process and it is drawn off from the still 2 via the nipple 28 as blow-down via a blow-down discharge line 90. The blow-down discharge line 90 connects to end of a blow-down flow control valve 92 (similar to the flow control vlave 46) and the output from the flow control valve 92 is connected through a check valve 94 to the drain line 38. The check valve 94, of course, functions to ensure that the blow-down may only flow toward the common drain line 32 and to permit proper start-up of the unit to be achieved, as indicated in more detail in copending application Ser. No. 317,623, aforesaid.

Figure 3:
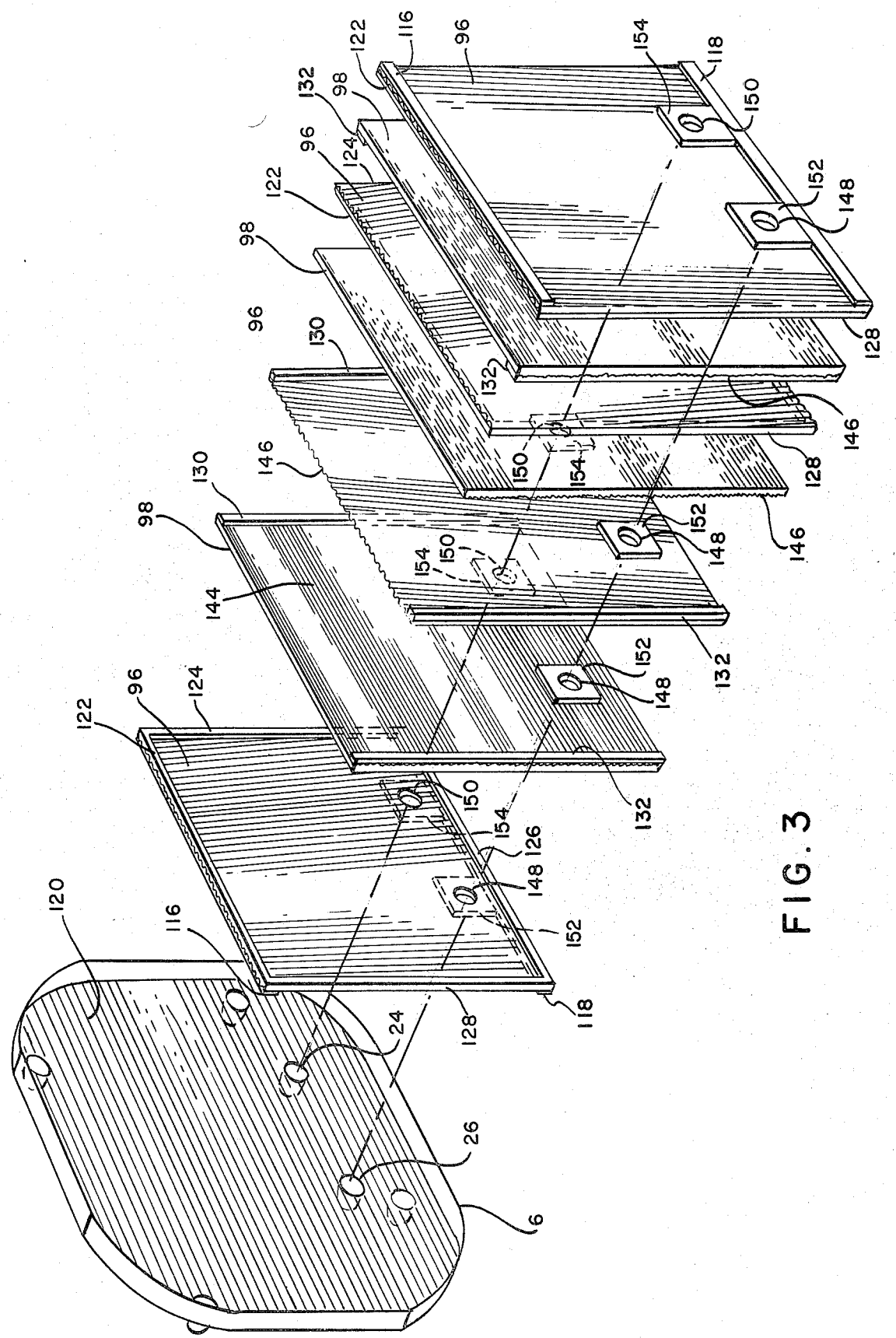
FIG. 3 provides a simplified exploded perspective of the subject invention.

As best seen in FIGS. 1, 3, and 5, the still 2 includes a plurality of impermeable barrier membranes 96 and microporous vapor permeable membranes 98. The barrier membranes 96 may typically comprise a polycarbonate material such as Lexan manufactured by the General Electric Company, Inc., and the microporous membranes 98 may typically comprise a polyvinylidene fluoride (as more fully described in U.S. Pat. Nos. 3,620,895, 3,642,668, 3,671,007, and copending application Ser. No. 209,064, filed Dec. 17, 1971) such as Kynar manufactured by Pennwald Corporation.

The membranes 96 and 98 are of generally rectangular shape and are arranged in stages in alternating, stacked, laminar relation within the housing 4. In essence, the still 2 comprises a plurality of stages with each stage comprising a first barrier membrane 96, a second barrier membrane 96, and a microporous vapor permeable membrane 98 sandwiched between the first and second barrier membranes 96, and the still 2 may typically comprise 18 such stages.

Referring again to FIGS. 1, 3, and 4, the front and rear cover portions 6 and 8, respectively, of the housing 4 are seen to be corrugated in the same direction and the corners of the housing 4 are seen to be rounded as at 100, 102, 104, and 106. The corners of the membranes 96 and 98 making up the multiple stages of the still 2 are in alignment and are sealed together and to the corner portions 100, 102, 104, and 106 of the housing 4 as along the lines 108, 110, 112, and 114 as by a suitable adhesive such as nitryl rubber sold and designated by B. F. Goodrich as A1060B.

As best seen in FIG. 3, the front barrier membrane 96, immediately adjacent the front cover portion 6 of the housing 4, is provided with a pair of spaced, parallel adhesive strips 116 and 118 along its upper and lower edge portions, respectively, as seen looking into FIG. 1. The adhesive strips 116 and 118 may typically comprise nitryl rubber, as aforesaid, and function to seal the upper and lower edges of the front barrier membrane 96 to the inner face 120 of the front cover portion 6. The opposite or inner face of the front barrier membrane 96 is provided with adhesive strips 122, 124, 126, and 128, of the same nitryl rubber, aforesaid, along all four of its respective edges, and the adhesive strips 122, 124, 126, and 128 function to provide a water-tight seal between the front barrier membrane 96 and the next adjacent microporous membrane 98.

Similarly, spaced, parallel nitryl rubber adhesive strips 130 and 132 are provided along the side edges of the face of the microporous membrane 98 remote from the front barrier membrane 96 and function to seal the side edges of the microporous membrane 98 to the corresponding side edges of the adjacent face of the rear barrier membrane 96 completing the first distillation stage.

Where the still 2 comprises 18 stages, as aforesaid, the pattern of adhesive strips sealing the various edges of the impermeable and permeable membrane sandwiches continues as aforesaid until the rearmost surface of the middle barrier membrane 96 (the rear barrier membrane 96 of the last stage in the first half of the still 2) is reached. As illustrated in FIG. 3, for purposes of clarity, the first stage is the only stage in the first half of the still 2 illustrated and the barrier membrane 96 completing the first stage of the still 2 is shown as it would be configured if it were the last barrier membrane 96 in the first half of the still 2. Of the 18 stages in the still 2, then, 9 stages would be included in each half of said still 2. Accordingly, the rear face of the barrier membrane 96 completing the first half of the still 2 is not provided with the adhesive strips 122, 124, 126, and 128 along its edges (as would be the case where the barrier membrane 96 where completing a previous stage) but is now seen to be provided with only the adhesive strips 124 and 128.

The elimination of the adhesive strips 122 and 126 on the rear surface of the barrier membrane completing the first half of the still 2 is necessary because the succeeding membranes of the still 2 are turned around for the successive stages for reasons which will be more apparent infra. Thus, the adhesive strip pattern for the succeeding stages (comprising the second half of the still 2) will be the same as that for the initial stages, but reversed from front to back. More specifically, the adhesive strip pattern for the second half of the still system will be the same as that for the first half of the still system if one now looks at the still considering the rear cover portion 8 as the front. Thus, the stack of membranes 96 and 98 are sealed together by the adhesive strips 116, 118, 122, 124, 126, 128, 130, and 132 and to the housing 4 along lines 108, 110, 112, and 114 to define four spaced chambers or reservoirs 134, 136, 138, and 140.

It should be emphasized at this point that the membranes 96 and 98 are so compressed together within the housing 4 that the outer faces of the first and last impermeable membranes 96 are in contact with the inner face 120 of the cover 6 and the inner face 142 of the cover 8, respectively. Additionally, one surface of each of the impermeable membranes 96 is in contact with one surface of each of the microporous membranes 98.

As best seen in FIGS. 1 and 3, each of the microporous membranes 98 in the first half of the still 2 (only one of which is shown) is provided with a series of alternating parallel depressions and raised sections having a generally sinusoidal configuration so as to appear generally corrugated as at 144 and the opposite surface of each of the microporous membranes 98 in the second half of the still are similarly corrugated as at 146. The corrugations as at 144 and 146 extend in the same direction as the corrugations in the front cover and rear cover portions 6 and 8, respectively, of the housing 4 and function in the manner to be described infra.

As best seen in FIGS. 1 and 3, each of the impermeable membranes 96 is corrugated such that the corrugations include both surfaces of the membranes 96 rather than merely one surface as in the case of the microporous membranes 98. Typically, the amplitude of the corrugations in the microporous membranes 98 is of the order of one or two mils., whereas the amplitude of the corrugations in the barrier membranes 98 is of the order of five mils.

The corrugations in the barrier membranes 96 do not extend in a direction perpendicular to the direction of the corrugations 144 and 146 in the microporous membranes, but extend in a direction canted (to the perpendicular to the direction of the corrugations 144 and 146 and, hence, to the direction of the corrugations in the housing cover portions 6 and 8) at a slight angle as, for example, 5°. Further, each of the barrier membranes 96 has the direction of its respective corrugations canted in the opposite direction from those of the immediately preceding and succeeding barrier membranes 96 in the multi-stages of the still 2. Thus, considering the three stages of the still 2 illustrated in FIG. 3, it is seen that the front barrier membrane 96 has its corrugations extended in a direction canted in one way, with respect to a direction normal to the direction of the corrugations in the adjacent microporous membrane 98, while the corrugations in the next succeeding barrier membrane 96 extend in a direction canted in the opposite way, to a direction normal to the direction of the corrugations in the microporous membrane 98.

Similarly, it is seen that the corrugations in the next barrier membrane 96 (moving away from the cover 6) are canted in the same direction as those of the front barrier membrane 96, while the corrugations in the last barrier membrane 96, adjacent the rear cover 8, are canted in the same direction as those of the second barrier membrane 96 after the cover 6.

It should be noted at this point that while the corrugations of all of the barrier membranes 96 are alternately canted in opposite directions, all of the corrugations of the barrier membranes 96 extend in the same general direction, i.e., a direction generally perpendicular to the direction of the corrugations as at 144 and 146 and the corrugations in the housing cover portion 6 and 8.

As best seen in FIGS. 3 and 4, each of the membranes 96 and 98 are provided with a pair of aligned, spaced apertures 148 and 150 which are axially aligned with the nipples 26 and 24 in the front cover portion 6 of the housing 4. The front barrier membrane 96 is sealed to the inner face 120 of the housing cover 6 in the region surrounding the apertures 148 and 150 as by adhesive tabs 152 and 154, respectively. Thus, any fluid between the front barrier membrane 96 and the housing cover 6 will be unable to enter the apertures 148 and 150. Similarly, the barrier membrane 96 adjacent the inner face of the housing rear cover portion 8 is sealed thereto about the apertures 148 and 150 by similar adhesive tabs 152 and 154 to prevent any fluid between the barrier membrane 96 and the housing rear cover portion 8 from entering the apertures 148 and 150.

The adhesive tabs 152 and 154 may be formed of nitryl rubber as aforesaid and it should be noted that each microporous membrane 98 in the still 2 is sealed on its corrugated face to the adjacent barrier membrane 96 at the area surrounding the apertures 148 and 150, as by similar adhesive tabs 152 and 154, to prevent any fluid between such corrugated face and the adjacent barrier membrane 96 from entering the apertures 148 and 150.

As best seen in FIGS. 1 and 5, the corrugations in the front and rear housing cover portions 6 and 8 function (in conjunction with the adjacent barrier membranes 96) to define unobstructed channels 156 and 158, respectively, communicating between the reservoirs 134 and 136. Similarly, the corrugated barrier membranes 96 cooperate with the adjacent smooth or non-corrugated faces of the microporous membranes 98 to define a plurality of flow channels 160 which will permit fluid to flow between a corrugated barrier membrane 96 and the smooth face of an adjacent microporous membrane 98 in a direction generally transverse that of the channels 156 and 158.

The corrugated barrier membranes 96 cooperate with the corrugated surfaces 144 and 146 of the adjacent microporous membranes 98 to define a plurality of flow channels 162 which permit fluid flow between the barrier membranes 96 and the corrugated faces 144 and 146 of the adjacent microporous membranes 98 in the same general direction as the channels 160. The corrugations in the microporous membranes 98 cooperate with the facing barrier membranes 96 to define a plurality of channels 164 which extend in the same direction as the channels 156 and 158 and permit fluid flowing in the channels 162 to be able to bypass the adhesive tabs 152 and 154 surrounding the ports or openings 148 and 150, respectively.

It should be noted at this point that the region surrounding the openings 148 and 150 on the smooth face of the microporous membranes 98 is not provided with the adhesive tabs 152 and 154 and, thus, fluid flowing through the channels 160 may enter the openings 148 and 150 and leave the still structure via the nipples 26 and 24. Further, inasumch as only two side edges of the corrugated surfaces 144 and 146 of the microporous membranes 98 are sealed to the facing barrier membranes 96, as at 130 and 132, fluid flowing between the corrugated face such as 144 or 146 of a microporous membrane 98 and a facing barrier membrane 96 may communicate between the chambers or reservoirs 138 and 140 via the channels 162.

Because the various corrugated barrier membranes 96 and microporous membranes 98 are compressed together to form the compact, multi-stage disposable still 2, it has been found that there is a tendency of the barrier membranes 96 to nest together and squeeze the porous membrane 98 sandwiched therebetween so as to block the channels 160 and 162. Indeed, such a blocking of the channels such as 160 and 162 is prone to occur in similar distillation systems such as described in the copending applications and issued patents described hereinabove wherein it is possible for alternate barrier membranes 96 to align in such a manner as for the crests of one of the corrugated barrier membranes 96 to urge the microporous membrane therebetween into the channels defined by the other corrugated barrier membranes 96.

Such an unfortunate occurrence is possible because each of the barrier membranes 96 in those previously described systems extends in precisely the same direction as the corrugations in every other one of the corrugated barrier membranes. In the present invention, however, by canting the corrugations of alternate barrier membranes 96 in opposite directions, nesting is prevented and the channels 160 and 162 are maintained in an open condition. Further, inasmuch as the corrugations of the alternating barrier membranes 96 are canted only slightly, the general direction of fluid flow through the channels 160 and 162 remains unchanged, a feature which greatly enchances the efficiency of the still 2.

Reiterating the operation of the still 2, cold water from the supply line 36 is regulated and supplied to the still 2 via the nipple 18. Cold water entering the still 2 via the nipple 18 will fill the reservoir 134 and flow through the channels 158 and 156, around the outside of the structure comprising the multi-stages of the still 2, to the reservoir 136. The cold water accumulating in the reservoir 136 is withdrawn from the still structure 2 via the nipple 22 for subsequent heating, deaeration, and pH control. After being heated, deaerated, and treated, the supply water or distilland enters the still 2 via the nipple 20 and begins to fill the reservoir 138 as the treated distilland. The distilland will then flow through the channels 162 to the reservoir 140 and in so flowing will be conducted about the various adhesive tabs 152 and 154 by the channels 164 so that the adhesive tabs 152 and 154 will not unduly limit fluid flow and thermal efficiency.

The cold supply water flowing between the reservoirs 134 and 136 will provide a temperature differential across the multi-stages of the still 2 such that the temperatures at the center of the still structure will be higher than the temperature of the stages adjacent the front and rear housing portions 6 and 8, respectively.

The distilland flowing through the channels 162 will pass along one face of each of the microporous membranes 98 and the vapor of the distilland (water vapor) will diffuse through the micropores of the membranes 98 to the channels 160 whereupon the distilled water vapor will be condensed by the coolant flowing in the channels 156 and 158.

After yielding up the solvent vapor (water vapor), the spent distilland reaching the reservoir 140 will be conducted out of the still structure 2 via the nipple 28 to a drain line such as a household sink drain line.

It should be emphasized at this point that the condensed vapor or distillate flowing through the channels 160 cannot communicate with the reservoirs 134, 136, 138, and 140 because of the adhesive strips aforesaid, but will flow downward through the channels 160 until the apertures 148 and 150 are reached. It will be recalled that the channels 160 are free to communicate with the apertures 148 and 150 and, thus, distillate reaching such apertures 148 and 150 in any of the stages of the still 2 will be conducted through the apertures 148 and 150 to the nipples 26 and 24, respectively, from which the distillate or potable product water may be withdrawn.

It can readily be seen that many other variations and modifications of the present invention are possible in the light of the aforementioned teachings, and it will be apparent to those skilled in the art that various changes in form and in arrangement of components may be made to suit requirements without departing from the spirit and scope of the invention. It is, therefore, to be understood that within the scope of the appended claims, the instant invention may be practised in a manner otherwise than is specifically described herein.

What is claimed is:

1. A disposable still structure, including:
   an array of alternating vapor-impermeable and vapor-permeable stacked membranes in uniformly spaced layers
   means defining a plurality of open channels on at least one surface of alternate ones of said impermeable membranes extending generally in a reference direction but canted in a first direction with respect to said reference direction;
   means defining a plurality of open channels on at least one surface of each of said impermeable membranes intermediate said alternate impermeable membranes and extending generally in said reference direction but canted with respect to said reference direction in a second direction;
   means for sealing discrete portions of adjacent impermeable and permeable membranes to close both said pluralities of open channels to define at least a plurality of channels for receiving distilland on one side of said plurality of permeable membranes; and means for maintaining a temperature differential across said permeable membranes whereby vapor from said distilland may pass through said permeable membranes and be condensed as distillate on the other side thereof.

2. The invention according to claim 1, further including a housing surrounding said array so as to define a jacket through which coolant may be introduced into contact with the exposed surfaces of said array.

3. The invention pursuant to claim 2, further including means for introducing distilland through said housing into said channels for receiving distilland and means for withdrawing distilland through said housing from said channels for receiving distilland.

4. The invention as set forth in claim 3, wherein both sides of each of said impermeable membranes are provided with a plurality of open channels with the open channels on both sides of any impermeable membrane extending both in the same general direction and canted in the same direction with respect to said reference direction.

5. The invention as recited in claim 4, wherein said sealing means cooperates with said permeable and impermeable membranes to define plural closed channels on both sides of each permeable membrane in said array with the channels on the sides of said permeable membranes opposite said distilland receiving channels, receiving said distillate.

6. The invention as delineated in claim 5, further including means communicating with said distillate receiving channels for conducting distillate therefrom through said housing.

7. The invention as stated in claim 6, wherein said communicating means includes at least one aperture in each of said membranes and in said housing, said apertures being coaxial.

8. The invention as related in claim 7, wherein one side of each of said permeable membranes is sealed to the facing surface of the adjacent impermeable membrane in the region about their coaxial apertures to prevent any distilland from entering said coaxial apertures.

9. The invention as set forth in claim 8, wherein the first and last membranes comprising said array are impermeable membranes.

10. The invention as recited in claim 9, wherein the side of said first membrane facing said housing and the side of said last membrane facing said housing are sealed to said housing in the regions surrounding their respective apertures.

11. The invention as set forth in claim 10, wherein said housing includes generally planar front and back cover portions with the faces of said cover portions adjacent said first and last membranes being corrugated to define a plurality of discrete open channels which extend in a direction generally transverse the channels in said first and last membranes.

12. The invention as stated in claim 11, further including means cooperable with said first and last membranes and said front and back cover portions to close said open channels in said cover portions and provide discrete conduits for the flow of coolant.

13. The invention as delineated in claim 12, further including means cooperable with said array and with said front and back cover portions to define first and second pairs of fluid reservoirs.

14. The invention in accordance with claim 13, further including means for introducing coolant into one of said first pair of reservoirs; means effecting communication between both of the reservoirs of said first pair of reservoirs via said channels in said front and back cover assemblies; and means for withdrawing coolant from the other of said pair of reservoirs.

15. The invention as recited in claim 14, further including means for introducing distilland into one of said second pair of reservoirs and means for withdrawing distilland from the other of said second pair of reservoirs.

16. The invention as set out in claim 15, further including means for enhancing the flow of distilland past the sealed region, surrounding the coaxial apertures, between facing permeable and impermeable membranes.

17. The invention according to claim 16, wherein said flow enchancing means includes a corrugated surface on one face of each said permeable membrane defining a plurality of open channels extending generally transverse the corrugations in the facing impermeable membrane.

18. A multi-stage distillation device of the type useful in distilling potable water from saline water by passing heated distilland over one surface of a microporous vapor-permeable, liquid-impermeable membrane and diffusing the vapor of said distilland through the pores of said membrane to the other side thereof where it may be cooled and condensed as potable water, including as elements in each of said multi-stages:

a first liquid and vapor-impermeable membrane having at least one corrugated surface;

a second liquid and vapor-impermeable membrane having a corrugated surface disposed facing a corrugated surface of said first impermeable membrane;

a vapor-permeable, liquid-impermeable membrane compressively sandwiched between said first and second impermeable membranes; and means for preventing the facing corrugated surface of said impermeable membranes from nesting together, thereby preventing said vapor permeable membrane from being compressively urged into said corrugations;

wherein the corrugations in said first impermeable membrane are canted in one direction with respect to a reference and the corrugations in said second impermeable membrane are canted in a direction opposite said one direction.

19. The invention as delineated in claim 18, wherein said corrugations in said first impermeable membrane facing said vapor-permeable membrane function as channels for the flow of distillate and said corrugations in said second impermeable membrane facing said vapor-permeable membrane function as channels for the flow of distilland.

20. The invention as related in claim 19, wherein said second impermeable membrane functions as the first impermeable membrane for a succeeding stage of said still and all of said membranes are arranged in stacked, laminar relation throughout the multi-stages of said still.

21. The invention according to claim 20, wherein one surface of each of said vapor-permeable membranes is corrugated to provide distilland flow channels in a direction generally transverse the corrugations in the impermeable membranes.

22. The invention as recited in claim 21, wherein the vapor-permeable membrane in one of said multi-stages is reversed front to back in orientation from the vapor-permeable membrane in the immediately preceding stage.

23. For use in distillation apparatus, a distillation unit comprising, in combination:
   a microporous membrane impermeable to liquid and permeable to the vapor thereof; and
   a pair of vapor-impermeable films disposed in contact with opposite surfaces of said membrane, said films being corrugated to provide channels between said films and said membrane and being arranged with the corrugations of said films being canted with respect to each other.

24. In distillation apparatus comprising a multiplicity of distillation stages each including a vapor-permeable, liquid-impermeable membrane and a pair of impermeable films disposed in face-to-face relation with said membrane; said membranes and films of a plurality of said stages being rectangular and arranged in alternating order in stacked, spaced, parallel relation with their edges in substantial alignment; the combination including:
   an external housing for enclosing the stack of said membranes and films comprising said distillation stages, said housing comprising a pair of complementary-shape housing structures formed of a liquid and vapor-impermeable material, said structures including facing main walls and side walls dependent from said main walls joined to one another to form a chamber containing said stack and having dimensions exceeding those of said stack;
   means for securing said stack of membranes and films to said housing at the corners of said stack to form four peripheral chambers between the sides of said stack and said side walls of said housing;
   means for introducing liquids into two of said peripheral chambers at adjacent sides of said stack and withdrawing said liquids from said peripheral chambers at the opposite sides of said stack; and
   means for circulating liquid through said stack between two of said peripheral chambers and around said stack between the other two peripheral chambers; said circulating means comprising corrugations in the surfaces of said films facing said membrane with the corrugations at opposite sides of said membrane being canted with respect to those on the other side of said membrane.

25. The invention according to claim 23, wherein the corrugations of said films are canted in opposite directions with respect to a reference direction.

26. The invention as recited in claim 24, wherein said canted corrugations are canted in opposite directions with respect to a reference direction.

27. The invention as delineated in claim 26, wherein said corrugations of said films on opposite sides of said membrane extend in the general direction of said reference direction.

* * * * *